(12) United States Patent
Lipkey et al.

(10) Patent No.: US 10,567,399 B2
(45) Date of Patent: Feb. 18, 2020

(54) FRAGMENTED MALWARE HASH LOOKUP IN CLOUD REPOSITORY

(71) Applicant: Cisco Technology, Inc., San Jose, CA (US)

(72) Inventors: Foster Glenn Lipkey, New Market, MD (US); John Joseph Groetzinger, Baltimore, MD (US); Aaron Frederick Louks, Frederick, MD (US)

(73) Assignee: Cisco Technology, Inc., San Jose, CA (US)

(*) Notice: Subject to any disclaimer, the term of this patent is extended or adjusted under 35 U.S.C. 154(b) by 358 days.

(21) Appl. No.: 15/471,306

(22) Filed: Mar. 28, 2017

(65) Prior Publication Data

US 2018/0288072 A1    Oct. 4, 2018

(51) Int. Cl.
*H04L 29/06*    (2006.01)
*H04L 9/06*     (2006.01)

(52) U.S. Cl.
CPC ........ *H04L 63/1416* (2013.01); *H04L 9/0643* (2013.01)

(58) Field of Classification Search
CPC ............... H04L 63/1416; H04L 9/0643; H04L 2209/38; H04L 63/145; H04L 9/0894
See application file for complete search history.

(56) References Cited

U.S. PATENT DOCUMENTS

| | | | |
|---|---|---|---|
| 7,577,848 B2 | 8/2009 | Schwartz et al. | |
| 8,935,446 B1 | 1/2015 | Shilane et al. | |
| 9,262,431 B2 | 2/2016 | Kolodner et al. | |
| 9,336,143 B1 | 5/2016 | Wallace et al. | |
| 9,390,116 B1 | 7/2016 | Li et al. | |
| 2005/0114666 A1* | 5/2005 | Sudia | H04L 9/3236 713/175 |
| 2012/0047284 A1 | 2/2012 | Tarkoma | |
| 2016/0182303 A1* | 6/2016 | Baba | H04L 67/12 370/351 |

OTHER PUBLICATIONS

S. Garfinkel, et al., "Hash-Based Carving: Searching Media for Complete Files and File Fragments With Sector-Hashing and Hashdb", proceedings of The Digital Forensic Research Conference, DFRWS 2015 USA, Philadelphia, PA, Aug. 9-13, 2015, http:/dfrws.org, 12 pages.
"Cisco Advanced Malware Protection—Breach Prevention, Detection, Response, and Remediation for the Real World", Cisco, Solution Overview, C22-734228-05, Nov. 2016, 6 pages.

* cited by examiner

*Primary Examiner* — Abiy Getachew
(74) *Attorney, Agent, or Firm* — Edell, Shapiro & Finnan, LLC

(57) ABSTRACT

A server communicates over a network with a data inspection device (DID) having access to at least portions of a data file, and assists the DID with matching the data file to known data files represented on the server. A hash tree is constructed for each known data file. To construct each hash tree: the known data file is fragmented into contiguous fragments; spaced fragments separated based on an offset schema are selected from the contiguous fragments; and nodes of the hash tree are generated based on hashes of the spaced fragments, but not the skipped fragments. A hash of a fragment of the data file is received from the DID, and it is compared to the hash trees constructed using the offset schema. Compare results are sent to the data inspection device indicating a match or a mismatch between the received hash and the hash trees.

20 Claims, 8 Drawing Sheets

FRAGMENTED MALWARE HASH LOOKUP IN CLOUD REPOSITORY

TECHNICAL FIELD

The present disclosure relates to detecting known data files in a network.

BACKGROUND

As Internet technologies evolve, network data transfer and inspection demands have also increased at the same pace. A need has emerged to effectively inspect large data transfers for malware, for example, without introducing noticeable latency. To create fingerprints of known files, conventional malware cloud lookup technologies perform hash digests of the entire contents of each of the files. Increases in the sizes and numbers of files result in corresponding increases in hash compute times and resources to compute the hashes. For example, a conventional hash digest of a 5 GB file may take 40 seconds or longer to compute, which causes massive latency if performed in-line with a data transfer between endpoints in a network. This poses a serious challenge to maintaining acceptable performance in, and reasonable hardware requirements for, a cloud lookup system. Additionally, detection of malware, even known malware, by conventional malware cloud lookup technologies is easily avoided by a bad actor. For example, simply adding padding bytes anywhere in the malware file changes a known fingerprint of the file to a new, unique fingerprint that is unknown and, therefore, not able to be detected. Even further, conventional malware lookup technologies typically limit the size of the files that are fingerprinted to avoid performance issues, which disadvantageously allows large portions of the files to go un-inspected.

DESCRIPTION OF EXAMPLE EMBODIMENTS

Overview

A method is performed by a server device configured to communicate over a network with a data inspection device having access to at least portions of a data file of interest, and assist the data inspection device with matching the data file to known data files represented on the server device. A respective hash tree is constructed for each known data file. To construct each hash tree: the known data file is fragmented into contiguous fragments; spaced fragments separated one from the next by a number of skipped fragments defined by an offset schema are selected from the contiguous fragments; and nodes of the hash tree are generated based on hashes of the spaced fragments, but not the skipped fragments. A hash of a fragment of the data file of interest is received from the data inspection device. The received hash is compared to the hash trees constructed using the offset schema, and compare results are sent to the data inspection device indicating a match or a mismatch between the received hash and the hash trees.

Example Embodiments

Figure 1:
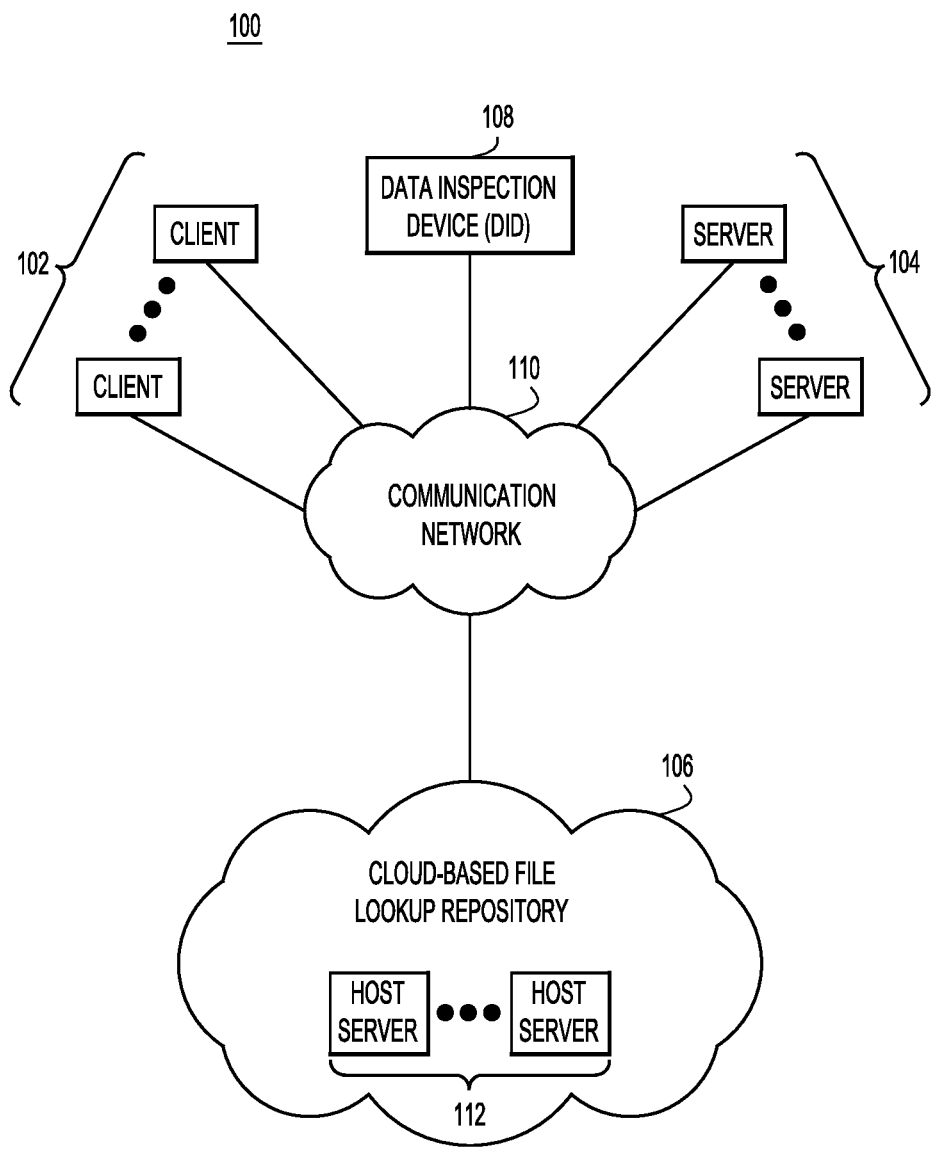
FIG. 1 is a block diagram of a network system in which embodiments directed to matching a data file of interest to known data files configured on a cloud repository may be implemented, according to an example embodiment.

Referring first to FIG. 1, there is shown a block diagram of an example network system 100 for cloud-based (i.e., "cloud") lookups in which embodiments directed to matching a data file of interest to known data files configured on a cloud repository may be implemented. System 100 includes client devices 102 (also referred to as "clients" 102), server devices 104 (also referred to as "servers" 104), a cloud repository 106 configured with representation or "fingerprints" of known data files, and a data inspection device (DID) 108 (also referred to as a file inspection device (FID)) each connected to a communication network 110. Cloud repository 106 may include one or more cloud or host servers 112 (collectively and singularly referred to as "host servers" 112 and "host server" 112, respectively) configured to construct and store the representations of the known data files. In an embodiment in which cloud repository 106 provides a malware lookup service, the known data files represent known malware and/or known trusted data files. Communication network 110 may include one or more local area networks (LANs) and one or more wide area networks (WANs), such as the Internet. Clients 102, servers 104, DID 108, and repository 106 may each communicate with each other over network 110 using any known communication protocol, such as the suite of Internet protocols, including the Transmission Control Protocol (TCP), the Internet Protocol (IP), and the Hypertext Transfer Protocol (HTTP). For example, clients 102, servers 104, DID 108, and repository 106 may exchange messages and data with each other in the form of IP packets in order to implement techniques presented herein.

In operation, clients 102 and servers 104 (collectively referred to as "endpoints") connect with each other over network 110, and then typical network traffic flows between the endpoints. For example, responsive to requests from clients 102, servers 104 may transfer data files stored locally at the servers to the clients over network 110, as is known. Servers 104 typically transfer data files to clients 102 as sequences of data packets, e.g., IP packets, which convey successive portions or data segments of the data files. DID 108 connects with clients 102 and/or servers 104 through network 110 so as to monitor the flow of traffic generally, but especially the transfer of the data files, between the endpoints. In one arrangement, DID 108 may be connected between the endpoints "in-line" so as to intercept/interrupt the flow of traffic between the clients and the servers, and thereby assert a level of control over the flow. In another arrangement, DID 108 may be connected so as to simply "tap into" and thus monitor the flow of traffic. DID 108 may take on a variety of forms, including that of client device, a server device, a network router, or a network switch configured with computer, storage, and network resources sufficient to implement the techniques presented herein. In addition the data inspection device may take the form of an application or service hosted on one or more of the endpoints.

It is often important to determine whether traffic flowing between the endpoints does or does not include known malware and, therefore, cannot be trusted or can be trusted. Sometimes it is advantageous to make such a determination while the traffic is flowing between the endpoints, for example, while servers 104 are transferring data files to clients 102 so that the traffic can be interrupted if it is determined to be malicious or allowed if determined to be trusted. According to embodiments presented herein, DID 108 and cloud repository 106 together operate as a malware cloud lookup system to match data files of interest, e.g., that are in transit between servers 104 and clients 102, or at rest in the DID, with any of known malware files, or known trusted files, represented in the repository. That is, DID 108 cooperates with cloud repository 106 to determine whether the data file matches, or does not match, any of the known malware files.

Figure 2:
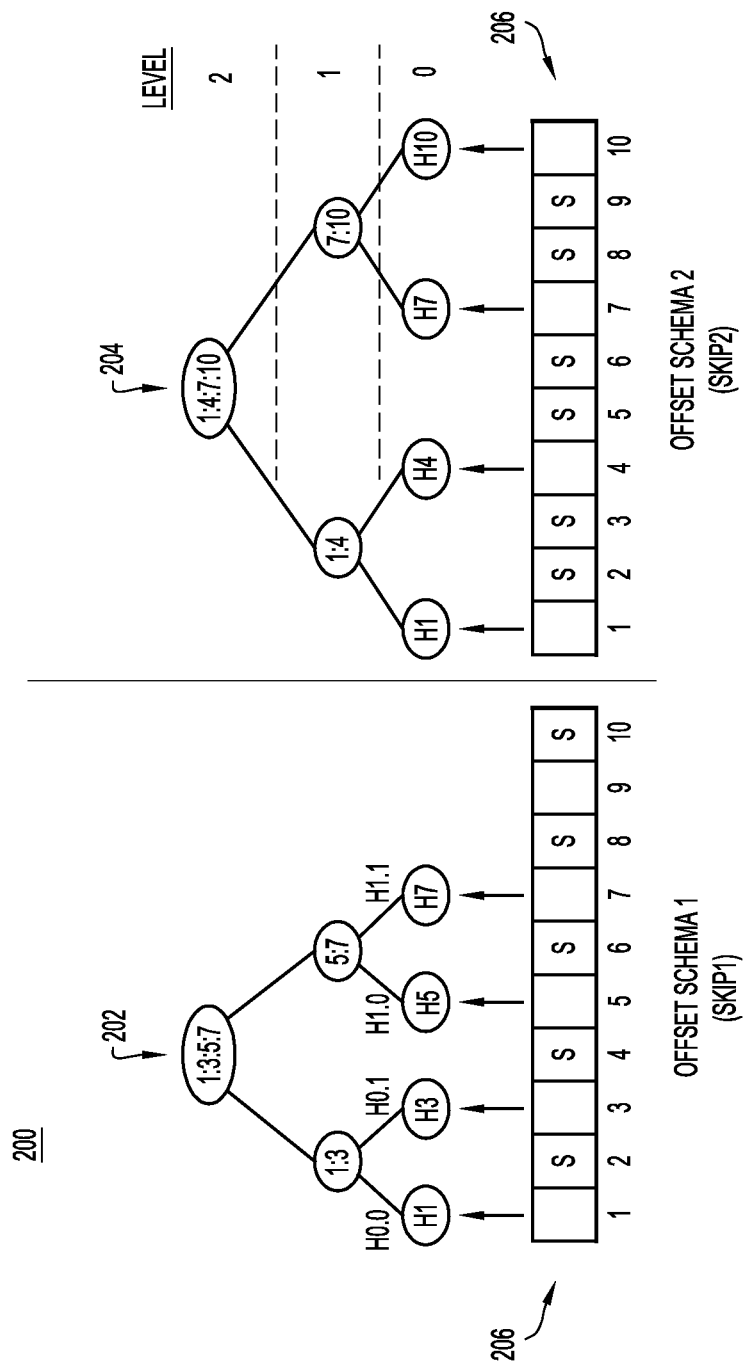
FIG. 2 is an illustration of data structures used by the cloud repository to generate hash trees representative of a known data file, according to an example embodiment.

With reference to FIG. 2, there is an illustration of example data structures 200 used by repository 106 to generates hash trees representative of a known data file, which may represent a malware file or a non-malware, trusted file. Repository 106 generates a hash tree 202 and a hash tree 204 from a (known) data file 206 accessible to the repository based on an offset schemas 1 and an offset schema 2, respectively, as will be described. Repository 106 stores hash trees 202 and 204 as different representations of the same data file 206. Repository 106 indexes stored hash trees 202 and 204 by their respective offset schemas 1 and 2, so that the repository is able to retrieve the different hash trees based on their different offset schemas. In an embodiment, hash trees 202 and 204 may be based on a Merkle tree construction, although other hash trees based on other types of hash tree constructions may be used.

Referring to the left-hand side of FIG. 2, repository 106 constructs hash tree 202 from data file 206 using offset schema 1. Repository 106 initially fragments or segments data file 206 into contiguous data fragments or data blocks (referred to simply as "fragments") indexed 1-10. All of fragments 1-10 may be the same size (e.g., contain the same number of bytes), or they may have different sizes. To fragment data file 206, repository 106 may traverse the data file from beginning to end marking/identifying respective start and end bytes for each of fixed length or variable length contiguous fragments 1-10. Repository 106 then selects from contiguous fragments 1-10 successive spaced or separated fragments 1, 3, 5, and 7 each spaced-apart from the next (immediately adjacent) spaced fragment by a number of contiguous skipped fragments defined by offset schema 1, i.e., 1 skipped fragment. The skipped fragments 2, 4, 6, 8, and 10 are denoted "S" for "skipped."

Repository 106 constructs hash tree 202 only based on selected/spaced fragments 1, 3, 5, and 7. That is, repository 106 constructs hash tree 202 based on spaced fragments 1, 3, 5, and 7, but not skipped fragments 2, 4, 6, 8, and 10. First, repository 106 generates individual/respective hashes H1, H3, H5, and H7 of respective ones of spaced fragments 1, 3, 5, and 7, and stores the hashes as leaf nodes at a lowest level 0 (or bottom) of hash tree 202. Such hashes are also referred to as "fragmented hashes" because they are hashes based on data file fragments. Any known or hereafter developed hashing technique may be used to generate the hashes, such as using SHA-1 hashes. Next, repository 106 generates combined hashes 1:3 and 5:7 based on leaf node hashes H1 and H2 and on leaf node hashes H5 and H7, respectively. The combined hashes may each represent a concatenation of two respective child hashes (e.g., H1 and H3) or, alternatively, a hash of the concatenated hashes. Repository 106 stores combined hashes 1:3 and 5:7 as non-leaf nodes at a level 1 of hash tree 202. Finally, repository 106 generates a further combined hash 1:3:5:7 based on combined hashes 1:3 and 5:7, and stores that combined hash as a root node at a highest level 2 of hash tree 202. Thus, hash tree 202 includes (i) leaf nodes H1, H3, H5, and H7 that are hashes of respective ones of spaced fragments 1, 3, 5, and 7, and (ii) non-leaf nodes (1:3, 5:7, 1:3:5:7) that are combined hashes of their respective children, leading to root node (1:3:5:7). Also, generally, hash tree 202 includes multiple levels in which the leaf nodes occupy the lowest level (e.g., 0) and the non-leaf nodes occupy ascending levels (e.g., 1) leading to the root node (2), which occupies the highest level.

All of the nodes in hash tree 202 may also be uniquely identified using a level, offset identifier (not to be confused with "offset schema"). For example, leaf nodes H1, H3, H5, and H7 may be identified respectively as nodes H0.0 (1st leaf node pair, left node—level 0, offset 0), H0.1 (1st leaf node pair, right node level 0, offset 1), H1.0 (2nd leaf node pair, left node—level 0, offset 0), and H0.1 (2nd leaf node pair, right node—level 0, offset 1). Similarly, non-leaf nodes 1:3 and 5:7 may be identified as nodes at level 1, offset 0, and level 1, offset 1, respectively.

Referring to the right-hand side of FIG. 2, repository 106 constructs hash tree 204 from data file 206 using offset schema 2, similarly to the way the repository uses offset schema 1 to generate hash tree 202. Repository 106 previously fragmented data file 206 to construct hash tree 202. Repository 106 selects from contiguous fragments 1-10 successive spaced fragments 1, 4, 7, and 10 each spaced-apart from the next by a number of skipped fragments defined by offset schema 2, i.e., 2 skipped fragments. Repository 106 then constructs hash tree 204 based on spaced fragments 1, 4, 7, and 10, but not any of the skipped fragments. First, repository 106 generates individual/respective hashes H1, H4, H7, and H10 of respective ones of spaced fragments 1, 4, 7, and 10, and stores the hashes as leaf nodes at a lowest level 0 of hash tree 204. Next, repository 106 generates combined hashes 1:4 and 7:10 based on leaf node hashes H1 and H4 and on leaf node hashes H7 and H10, respectively, and stores the combined hashes as non-leaf nodes at a level 1 of hash tree 204. Finally, repository 106 generates a combined hash 1:4:7:10 based on combined hashes 1:4 and 7:10, and stores that combined hash as a root node at a highest level 2 of hash tree 204.

Figure 3:
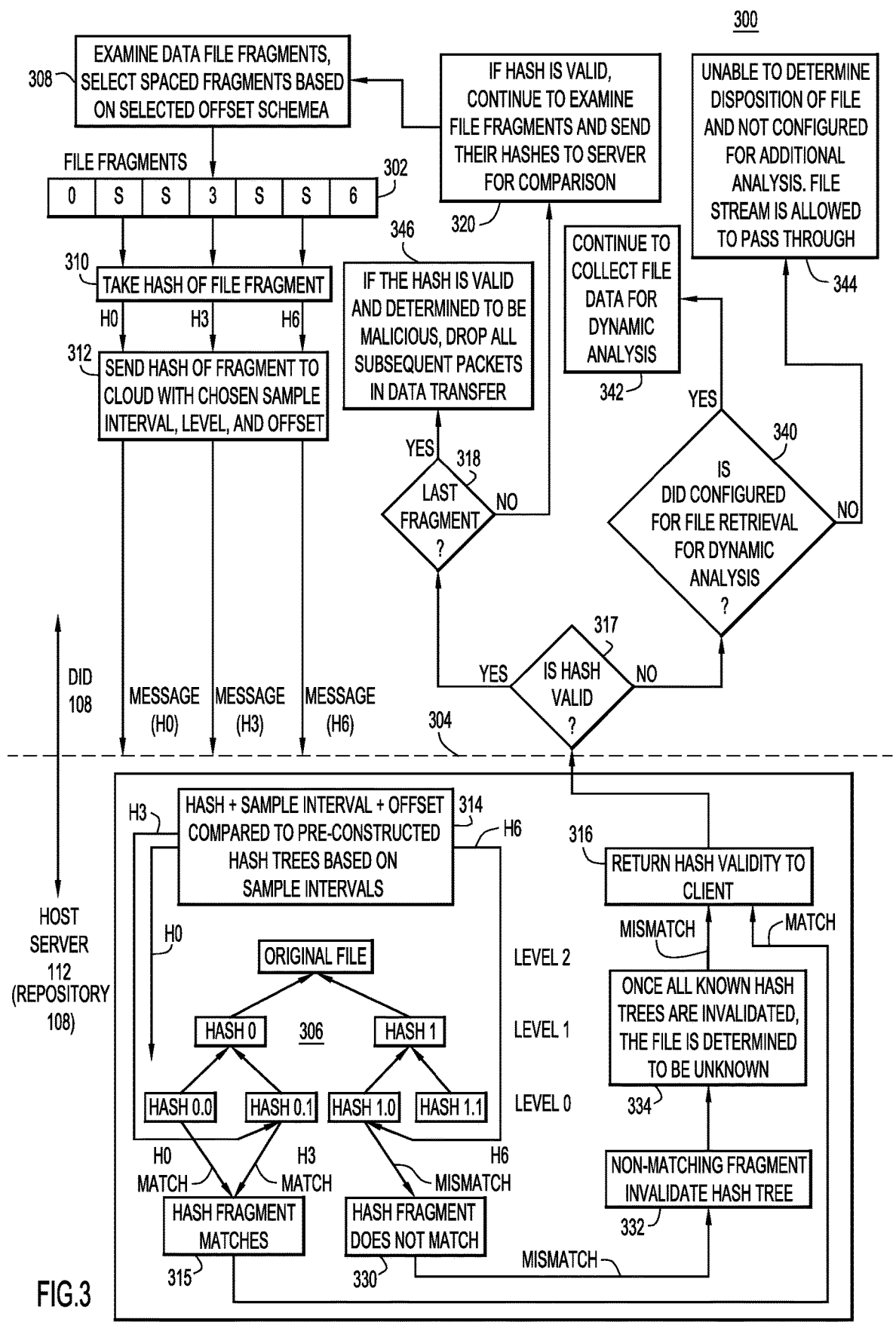
FIG. 3 is an illustration of a method in which a data inspection device in the network system interacts with the cloud repository to match the data file of interest with the known data files represented as hash trees configured on the cloud repository, according to an example embodiment.

With reference to FIG. 3, there is an illustration of a method 300 in which DID 108 interacts with repository 106, and more specifically with one of host servers 112, over network 110 to match a data file of interest 302 accessible to the DID with known data files represented as hash trees on host server 112/repository 106. The known data files may include known malware files and/or known trusted files. In FIG. 3, DID 108 performs operations and uses data structures shown above a dotted line 304, while host server 112 performs operations and uses data structures shown below the dotted line. Host server 112 typically stores/accesses many hash trees in repository 106 representative of many respective known data files. In one embodiment, host server 112/repository 106 stores a respective hash tree, constructed based on a known offset schema, representative of each known data file. In another embodiment, host server 112 stores multiple respective hash trees, constructed based on corresponding ones of multiple offset schemas, representative of each known data file. For example, host server 112 may store 3 hash trees based on 3 different offset schemas for each known data file, in which case 300 known data files would be represented as 300 hash trees. Although host server 112/repository 106 store many such hash trees, for ease of illustration, only one of the hash trees, i.e., a hash tree 306, is shown in FIG. 3.

Initially, DID 108 acquires access to data file 302. Data file 302 may be stored in its entirety in a memory of the DID. Alternatively, DID 108 may receive from any of endpoints 102/104 data file 302 as a sequence of data packets each including a respective data portion/segment of the data file. At 308, DID 108 fragments data file 302 into contiguous fragments 0-6. If data file 302 is at rest on DID 108, i.e., the entire data file is initially available to the DID, then DID may fragment the entire data file at one time. On the other hand, if DID 108 receives data file 302 as a sequence of data segments, the DID fragments each of the data segments into contiguous fragments as the data segments arrive at the DID. If known, DID 108 may fragment data file 302 based on a Multipurpose Internet Mail Extensions (MIME) type of the file. DID 108 also selects an offset schema from multiple offset schemas known to the DID, for example, stored in the memory of the DID. The selected offset schema matches at least one offset schema used by host sever 112 to construct hash trees stored on the host server/repository, such as hash tree 306. In FIG. 3, the offset schema is also referred to as a "sample interval."

Also at operation 308, starting with a first of contiguous fragments 0-6, DID 108 begins selecting successive spaced fragments from the contiguous fragments, such that the spaced fragments are separated one from the next by a number of skipped fragments (each denoted "S") defined by the offset schema. In the example of FIG. 3, the offset schema defines the number of skipped fragments as 2, which essentially establishes a sample interval of 3 (i.e., every $3^{rd}$ fragment is to be sampled/selected). Thus, DID 108 selects fragments 0, 3, and 6 as the spaced or sampled fragments. In the embodiment of FIG. 3, DID 108 and host server 112 sequentially process the successive spaced fragments, as follows.

At 310, DID 108 generates a hash based on the current spaced fragment. Initially, DID 108 generates a hash H0 of fragment 0. At 312, DID 108 generates and sends to host server 112 a message representing a first request for a fragmented hash compare/match (also referred to more simply as a "lookup request"). The first lookup request includes (i) the hash to be compared, i.e., hash H0, (ii) an indication of the selected offset schema used to generate the hash, and (iii) an indication of a level of a hash tree at which the hash should be compared in host server 112. The first lookup request may also include an indication of a node offset at the indicated level, which identifies a specific node at that level. Regarding the indicated level, since hash H0 corresponds to a leaf node, DID 108 sends an indication of level 0. An example message format for the first lookup request is described below in connection with FIG. 4.

Host server 112 receives the first lookup request including hash H0 and the indications of the selected offset schema and level. At 314, using the selected offset schema, host server 112 accesses hash trees against which the hash from DID 108 is to be compared. For example, host server 112 accesses hash tree 306, and compares hash H0 to nodes of hash tree 306 at level 0, i.e., the leaf nodes. At 315, host server 112 finds a match at leaf node hash 0.0 and, at 316, sends to DID 108 a message representing a first lookup response to the first lookup request indicating that hash H0 has a match (i.e., is valid). An example message format for the first lookup response is described below in connection with FIG. 5.

DID 108 receives the first lookup response from host server 112. At 317 and 318, DID 108 processes the first lookup response to determine whether a match is indicated for hash H0 and whether there are further spaced fragments in data file 302 available for processing, respectively. In this case, a match for hash H0 is indicated, and there are further spaced fragments to process (e.g., fragment 3 and possibly fragment 6). Under these conditions, at 320, DID 108 selects the next successive spaced fragment, i.e., fragment 3, from the available contiguous fragments, and the above-described matching process is repeated, as described below beginning again with operation 310.

At 310, DID 108 generates a hash based on fragment 3 and, at 312, sends to host server 112 a second lookup request, including the hash, the selected offset schema, and a level. In one example, DID 108 generates a hash H3 of fragment 3, and sends the second lookup request to include hash H3, an indication of the selected offset schema, and an indication of level 0 (and node offset 1), since hash H3 corresponds to a right leaf node. In another example, DID 108 generates hash H3, generates a combined hash H0:H3 of previous hash H0 and hash H3, and sends the second lookup request to include the combined hash, an indication of the selected offset schema, and an indication of level 1 (and node offset 0), since the combined hash corresponds to a non-leaf node at level 1 of a hash tree. In a general sense, in each iteration through operations 310 and 312, DID 108 essentially generates a single hash node of a hash tree that represents data file 302 based on the selected offset schema, and then sends the single hash node to repository 106 for lookup against corresponding hash nodes in the hash trees. Over successive iterations, DID 108 constructs the hash tree for the data file of interest node by node, sending the nodes sequentially to repository 106 for look up. Each hash node may be uniquely identified in the hash tree for the data file of interest by a node offset and a level included with the lookup request for that hash node.

At 314, host server 112 compares hash H3 (or combined hash H0:H3) to corresponding nodes of hash tree 306 at level 0 (or level 1) and, at 315, finds a match. At 316, host server 112 generates and sends to DID 108 a second lookup response to the second lookup request indicating that hash H3 (or combined hash H0:H3) has a match (i.e., is valid), and DID 108 receives the second lookup response.

At 317 and 318, DID 108 determines there is a match for hash H3 (or combined hash H0:H3), and there are further spaced fragments to process (e.g., fragment 6). Under these conditions, at 320, DID 108 selects next successive spaced fragment 6 from the available contiguous fragments, and the above-described matching process is repeated. Specifically, at 310, DID 108 generates a hash based on fragment 6 and, at 312, sends to host server 112 a third lookup request including the hash with indications of the selected offset schema and level. For example, DID 108 generates a hash H6 of fragment 6, and sends hash H6 to host server 112 along with the selected offset schema and an indication of level 0, since hash H6 corresponds to a leaf node. Alternatively, a combined hash, and higher corresponding level, may be sent in the third lookup request. At 314, host server 112 compares hash H6 to nodes of hash tree 310 at level 0 and, at 330, determines a mismatch. Responsive to the mismatch, at 332, host server 112 invalidates hash tree 306. Also in response to the mismatch, at 334, host server 112 searches remaining valid hash trees, configured on repository 106 and that were also constructed based on the selected offset schema, for a match against hash H6. If the search invalidates all of the hash trees stored on host server 112 because not one hash tree held a match for hash H6, then host server 112 declares a mismatch (i.e., the hash is invalid) and, at 316, sends to DID 108 a third lookup response (to the third lookup request) indicating the mismatch.

DID 108 receives the third lookup response and, at 317, determines there is an indicated mismatch. The mismatch indicates that data file 302 does not match any known data files represented on host server 112/repository 106. In this case, flow proceeds to 340, where DID 108 determines whether the DID is configured for file retrieval for dynamic file analysis. If so, at 342, DID 108 continues to collect file data related to data file 302 for dynamic analysis, and which may be uploaded to host server 112. If not, at 344, DID 108 takes no further action with respect to data file 302, except to allow/permit transfer of the data file to or from one or more endpoints.

In an alternative example, last hash H6 is a match, not a mismatch. In this alternative example, DID 108 has traversed data file 302 in its entirety by sending all available hashes H0, H3, and H6 to host server 112, and the host server has returned indications of matches (i.e., hashes valid) for all of the hashes. In this case, at 317 and 318, DID 108 determines that matches were found for all hashes and, therefore, data file 302 matches one of the known data files represented on host server 112, i.e., the data file is known. If the matched known data file represent malware, at 346, DID 108 declares data file 302 as malicious, and takes action to block any further transfer of the data file to or from endpoints.

Having described method 300 above, further advantages and examples of performing file lookups according to embodiments presented herein are now described below. As mentioned above, to avoid the conventional approach of computing a hash digest of an entire data file of interest for a lookup against a conventional cloud repository of known malicious and/or trusted similarly constructed file hashes, DID 108 fragments the data file of interest either as the file transits network 110 or while the file is at rest on the DID. The fragmentation process may take into account a file structure of the MIME type, if identified for the file. Hashing all of the individual fragments, i.e., each and every fragment, of the file may not provide any significant improvement in performance. Thus, DID 108 hashes only segments set at offsets or intervals from each other within the file to improve performance. For example, given a fragmented file including fragments: 0, 1, 2, 3, 4, 5, 6, 7, 8, 9, 10, DID 108 may choose to hash only fragments with an offset of 1, e.g., fragments 1, 3, 5, 7, 9. Alternatively, DID 108 may choose to hash only fragments with an offset of 2, e.g., fragments 1, 4, 7, 10. The larger the offset, the larger the improvement in performance due to the lesser number of fragmented hashes to be calculated.

One concern might be that sending a large number of fragmented hashes to repository 106 may increase the volume of traffic needed for lookups over simply hashing the whole file; however, this is limited by allowing a configurable hash tree level at which to confirm the fragmented hashes from the data file of interest relative to the hash trees in repository 106. If level 0 is chosen, the individual fragment hashes of the data file will be validated against the lowest level of each hash tree in repository 106. If level 1 is chosen, then a combined hash of child fragments from the data file is validated against nodes at level 1 of the hash trees (e.g., hash 0 at level 1 of each hash tree). Choosing a low level results in sending more fragmented hashes and thus increasing network transmissions, but correspondingly decreases the computational burden on DID 108 by limiting the number of hash operations to be performed. In contrast, choosing a high level involves more hash operations and thus places a higher computational burden on the DID 108, but lowers the amount of network transmissions that need to occur. An advantage of applying the fragmented hash structure and comparisons to validate a file in transmission is that the process quickly determines if the file is unknown, before the entire file has been transmitted.

Also as described above, repository 106 stores N number of pre-computed hash trees for each data file where N is the number of offset schemas used to construct the hash trees. DID 108 may choose one of the N offset schemas at random to determine which fragments to select from a given data file of interest. Having multiple offset schemas to choose from, and selecting one at random at the start of a file transfer between endpoints (and at the start of a file comparison using repository 106), makes it difficult for malware actors to evade detection using a malware file crafted to match a non-malicious file in the repository. To avoid detection by the embodiments presented herein, the malware file would have to be crafted so that its fragments match the multiple offset schemas, which would be nearly impossible to do while retaining intended functionality and integrity of the malware file structure.

The following example assumes repository 106 stores hash trees based on 3 offset schemas A (skip 1), B (skip 2), and C (skip 3), so 3 hash trees, for each known data file. Using offset schema A, DID 108 fragments a data file of interest into M number of raw data fragments each 1 MB in size, and the hash value of each fragment will be a SHA-1 hash of the bytes. Schema A only uses every other fragment to build the hash tree for the entire data file. So, for an 8 MB file, schema A results in 4 spaced fragments including the first, third, fifth, and seventh 1 MB fragments of the file.

In this example, level 0 of the hash tree represents the SHA-1 value of the 1 MB fragments. Level 1 represents the SHA-1 value of the combined SHA-1 values of 2 fragments from level 0. For example:

a. Level 0, (node) offset 0 ($1^{st}$ 1 MB of file) has a SHA-1 value of:
c4b5c86bd577da3d93fea7c89cba61c78b48e589.

b. Level 0, offset 1 (3$^{rd}$ MB of file) has a SHA-1 value of: 51eac6b471a284d3341d8c0c63d0f1a286262a18.
c. Level 1, offset 0 has a concatenated value of: 3ee9c3215636cade68285944ad000251dd3e982d, which is the resultant value of concatenating the SHA-1 values of fragments 0 and 1 from level 1, i.e.: c4b5c86bd577da3d93fea7c89cba61c78b48e589+ 51eac6b471a284d3341d8c0c63d0f1a286262a18; or SHA-1(c4b5c86bd577da3d93fea7c89cba6 1c78b48e589 51eac6b471a284d3341d8c0c63d0f1a286262a18).

Repository 106 receives a lookup request and does lookups against stored hash trees based on the offset schema (which represents a number of skips) and level included in the lookup request. For example, using the example above, repository 106 receives a lookup request including a hash value for offset schema A, node offset 0, and level 1 (here, the offset indicates a node offset at the indicated level, i.e., identifies a specific node at that level). The lookup request may formatted as follows:

Request: A:0:1:3ee9c3215636cade68285944ad 000251dd3e982d.

Responsive to receipt of the lookup request, repository 106 looks-up all hash trees built using offset schema A, trying to find a match where the value of the hash at level 1 and offset 0 in each hash tree is equal to the hash value that was sent (3ee9c3215636cade68285944ad000251d d3e982d). If there is a match, repository 106 continues to request additional fragments (e.g., more offsets from the same level).

If there are no matches, it is reliably determined that disposition of the file is unknown. At this point there are additional options which may be chosen on how to proceed:
a. If DID 108 is configured to send unknown files to the cloud, then the DID stops calculating SHA-1 values for the file, and captures and transfers to the cloud remaining portions of the file;
b. The DID ceases inspection of the file and allows pass-through of the file between endpoints; and
c. If there was a way to reliably determine that there was a partial match on a file, the partial match could potentially be given a score, and the DID may be configured to handle the scored, partial match. For example, assume a malware file added additional padding bytes only to the end of the file, and 6 out of 7 fragments matched a hash tree for a file that is marked as malware, the cloud can return a partial malicious match with a certain score and, based on settings defined on the DID, the DID may drop or allow the file to pass based on the score returned.

Figure 4:
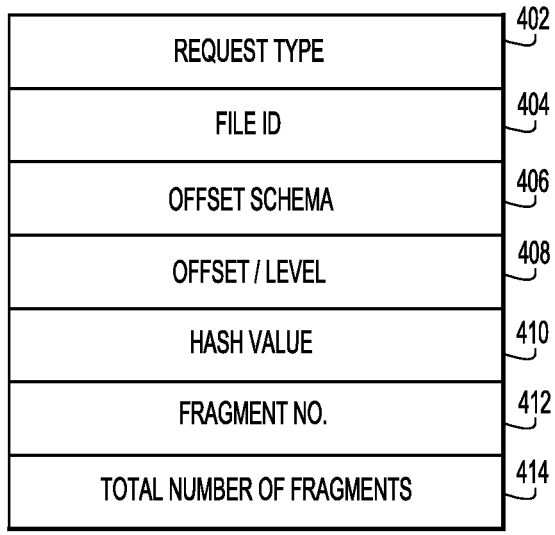
FIG. 4 there is an illustration of a message format for a hash lookup request generated by the data inspection device and sent to the cloud repository, according to an example embodiment.

With reference to FIG. 4, there is an illustration of a message format for an example lookup request 400 sent from DID 108 to repository 106. Request 400 includes: a request type 402 indicating the request for compare/match; a file identifier (ID) 404 to identify the data file of interest; an offset schema 406 to indicate the offset schema used to generated a fragmented hash included in the request (see field 410); a node offset and level 408 at which hash tree compares are to be performed in repository 106; a fragmented hash value 410; a fragment number/ID 412 to indicate a current fragment on which the hash is based; and a total number of fragments 414 to indicate a total number of fragments in the data file interests, if known.

Figure 5:
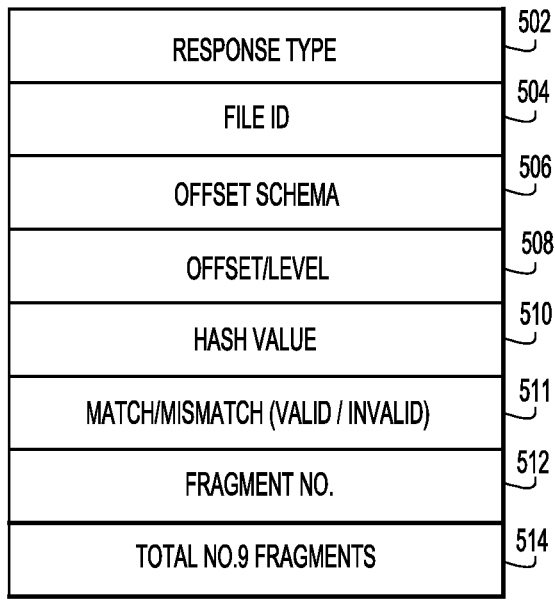
FIG. 5 is an illustration of a format of a hash lookup response generated by the cloud repository and sent to the data inspection device in response to the lookup request, according to an example embodiment.

With reference to FIG. 5, there is an illustration of a format of an example lookup response 500 to lookup request 400. Typically, lookup response 500 will be matched to a corresponding lookup request 400, and most of the fields in the response will reflect corresponding fields in that request. Lookup response 500 includes: a response type 502 to indicate the message is a response; a file ID 504 matched to the file ID 404 in the lookup request to which the response is matched; an offset schema 506; a node offset and level 508; a hash value 510; a match/mismatch (i.e., valid/invalid) indicator 511; a fragment number 512; and a total number of fragments 514. To improve efficiency, lookup response 500 may include only fields 502, 504, 511, and 512.

Figure 6:
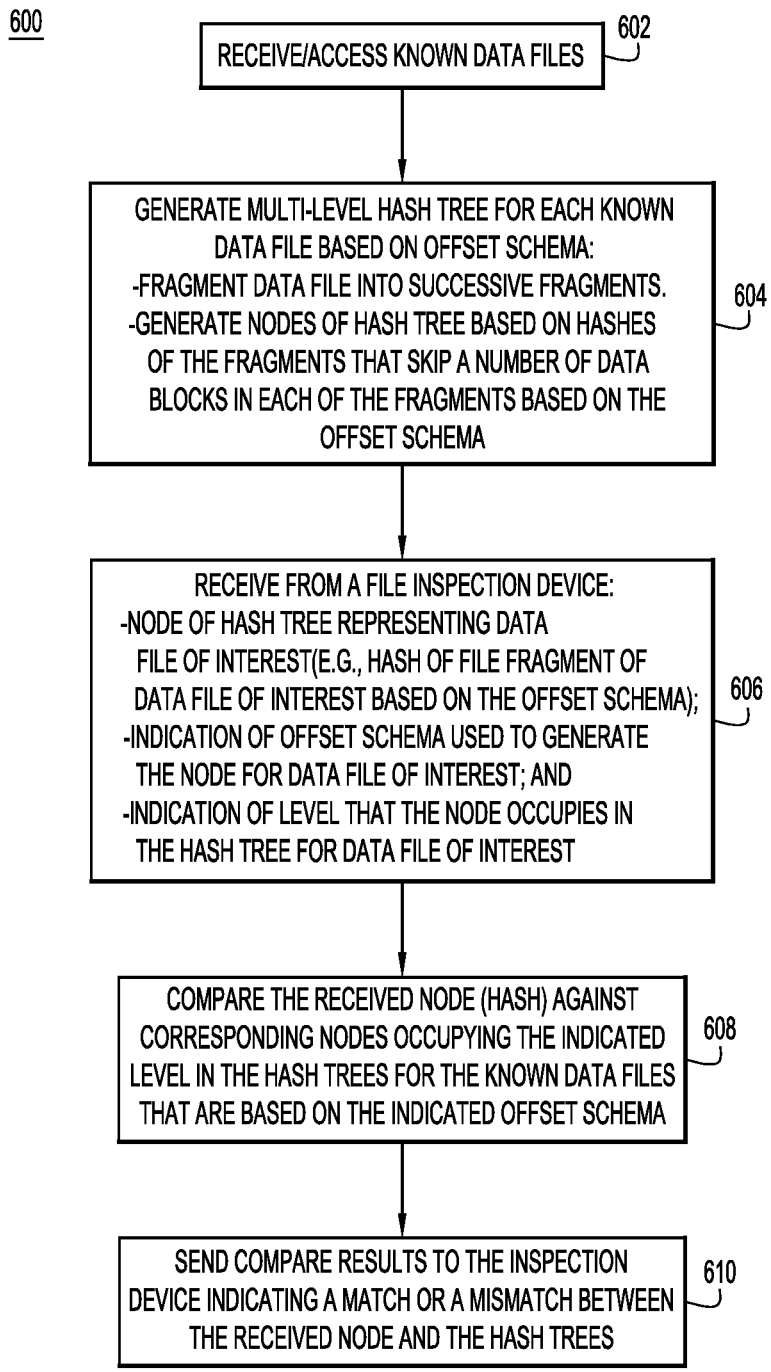
FIG. 6 shows operations performed by a host server of the cloud repository to construct hash trees from known data files and assist the data inspection device with matching a data file of interest to the hash tree, according to an example embodiment.

With reference to FIG. 6, there are shown operations 600 performed by host server 112 to construct hash trees from known data files and assist DID 108 with matching a data file of interest to the hash trees. Operations 600 reflect operations described above from the perspective of host server 112.

At 602, host server 112 receives/accesses the known data files.

At 604, host server 112 constructs for each known data file multiple multi-level hash trees based on respective ones of multiple offset schema. To construct a hash tree for a known data file based on a given offset schema, host server 112:
a. Fragments the known data file into contiguous fragments;
b. Selects from the contiguous fragments spaced fragments separated one from the next by a number of skipped fragments defined by the given offset schema; and
c. Generates nodes of the hash tree only based on hashes of the spaced fragments, but not the skipped fragments (i.e., only based on the spaced fragments).

Operation 604 results in hash trees each includes leaf nodes that are each as a hash of a respective one of the spaced fragments, and non-leaf nodes that are combined hashes of their respective children, including the leaf nodes, leading to a root node.

At 606, host server 112 receives from DID 108 a request (e.g., request 400) to compare a fragmented hash against the hash trees configured on the host server. DID 108 generated the fragmented hash from one or more spaced fragments of the data file of interest based on an offset schema selected by the DID. The fragmented hash essentially represents a single node of a hash tree representing the data file of interest that could be constructed based on the offset schema selected by the DID. The request includes (i) the fragmented hash, (ii) an indication of the offset schema used by DID 108 to generate the hash, and (iii) an indication of a level of the nodes in the hash trees configured on host server 112 against which the hash is to be compared. The level also matches the level of the fragmented hash (e.g., a node) in the hash tree that represents the data file of interest.

At 608, host server 112 compares the fragmented hash against nodes occupying the indicated level in the hash trees representing the known data files constructed based on the indicated offset schema.

At 610, host server 112 sends compare results to DID 108 indicating a match or a mismatch between the fragmented hash and the hash trees configured on the host server.

Operations 606-610 repeat over time.

Figure 7:
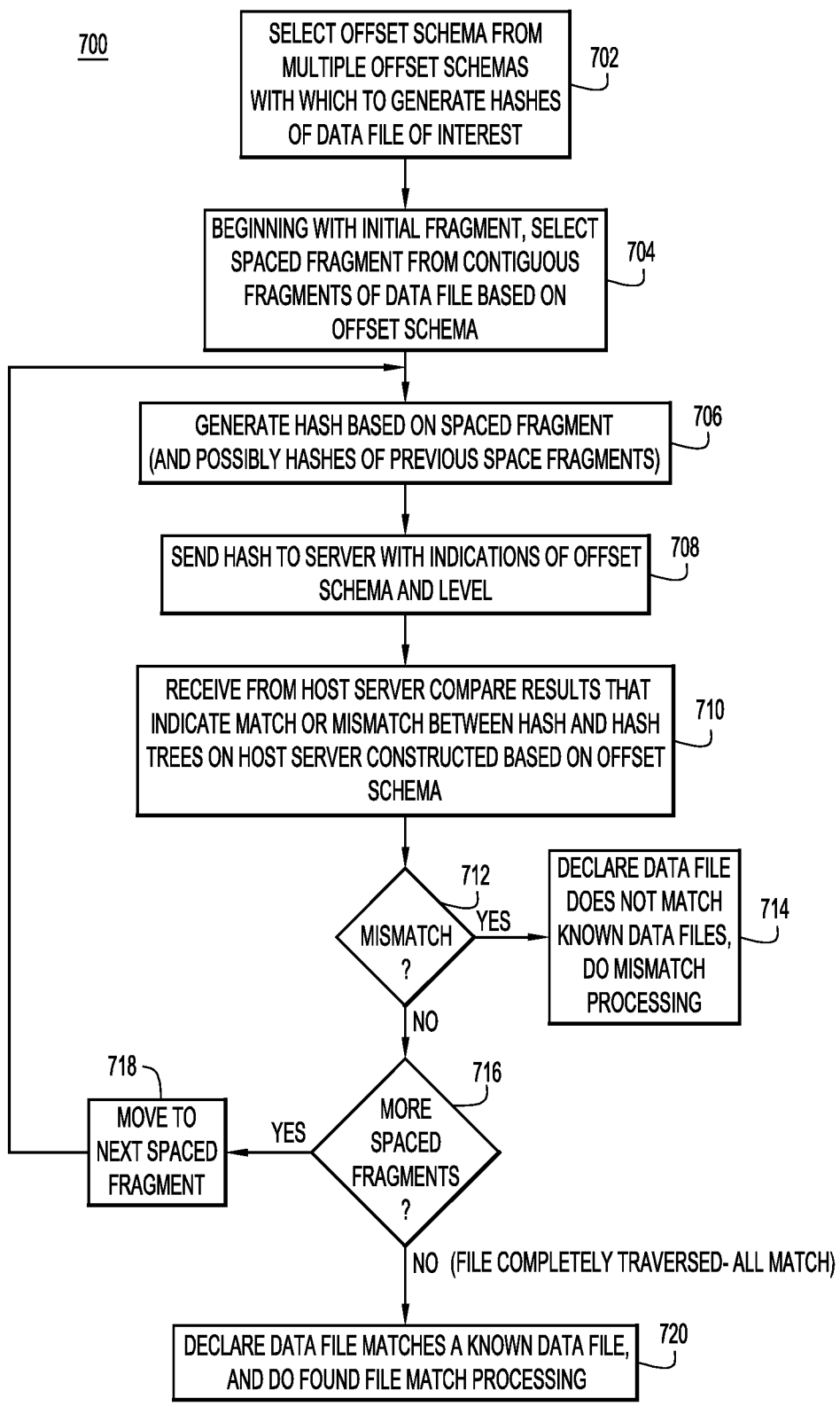
FIG. 7 shows operations performed by the data inspection device to match a data file of interest accessible to the data inspection device to known data files represented as hash trees on the host server, according to an example embodiment.

With reference to FIG. 7, there are shown operations 700 performed by DID 108 to match a data file of interest accessible to the DID to known data files represented as hash trees on host server 112. Operations 700 reflect operations described above from the perspective of DID 108.

At 702, DID 108 selects an offset schema from multiple offset schemas with which to generate fragmented hashes of the data file of interest. DID 108 may have access to the data file at one time in it is entirety, or may receive segments or portions of the data file sequentially over time as the data file transits network 110.

At 704, beginning with a start of the data file, DID 108 fragments the data file into contiguous fragments. Beginning with an initial one of the fragments, DID 108 selects spaced successive fragments from the contiguous fragments based on the selected offset schema.

At 706, DID 108 generates a fragmented hash based on one or more of the spaced fragments.

At 708, DID 108 sends the fragmented hash to host server 112 with indications of the selected offset schema and a level of the hash trees at which the fragmented hash is to be compared to hash trees configured on the host server.

At 710, DID 108 receives from host server 112 compare results that indicate a match or a mismatch between the fragmented hash and the hash trees constructed based on the selected offset schema.

At 712, DID 108 determines whether a mismatch or a match is indicated. If a mismatch is indicated, flow proceeds to 714. At 714, DID 108 declares that the data file does not match any known data file, and performs file mismatch processing. On the other hand, if a match is indicated, flow proceeds to 716.

At 716, DID 108 determines whether there are more spaced fragments to process. If so, flow proceeds to 718. At 718, DID 108 moves to a next spaced fragment, and flow returns to 706. If not, i.e., the last hash matched, flow proceeds to 720.

At 720, DID 108 declares that the file is known, and performs known file processing.

Figure 8:
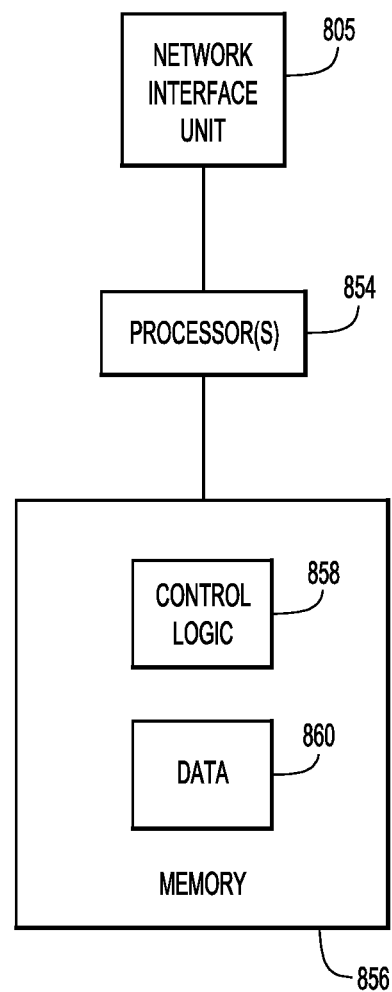
FIG. 8 is a block diagram of a computer device representative of either the data inspection device or the host server in the data repository.

With reference to FIG. 8, there is a block diagram of an example computer device 800 representative of either DID 108 or one of host servers 112. Computer device 800 includes network interface unit 805 to communicate with a wired and/or wireless communication network. Computer device 800 also includes a processor 854 (or multiple processors, which may be implemented as software or hardware processors), and memory 856. Network interface unit 805 may include an Ethernet card with a port (or multiple such devices) to communicate over wired Ethernet links and/or a wireless communication card with a wireless transceiver to communicate over wireless links.

Memory 856 stores instructions for implementing methods described herein. Memory 856 may include read only memory (ROM), random access memory (RAM), magnetic disk storage media devices, optical storage media devices, flash memory devices, electrical, optical, or other physical/tangible (non-transitory) memory storage devices. The processor 854 is, for example, a microprocessor or a microcontroller that executes instructions stored in memory. Thus, in general, the memory 856 may comprise one or more tangible computer readable storage media (e.g., a memory device) encoded with software comprising computer executable instructions and when the software is executed (by the processor 854) it is operable to perform the operations described herein. For example, memory 856 stores control logic 858 to perform operations of (i) DID 108 in a case where computer device 800 represents the DID, or (ii) host server 112 in a case where the computer device represents the host server. The memory 856 may also store data 860 used and generated by logic 858. For example, in the case where computer device 800 represents host server 112, data 860 includes hash trees representative of known data files. In a case where computer device 800 represents DID 108, data 860 includes portions of the data file of interest.

Figure 9:
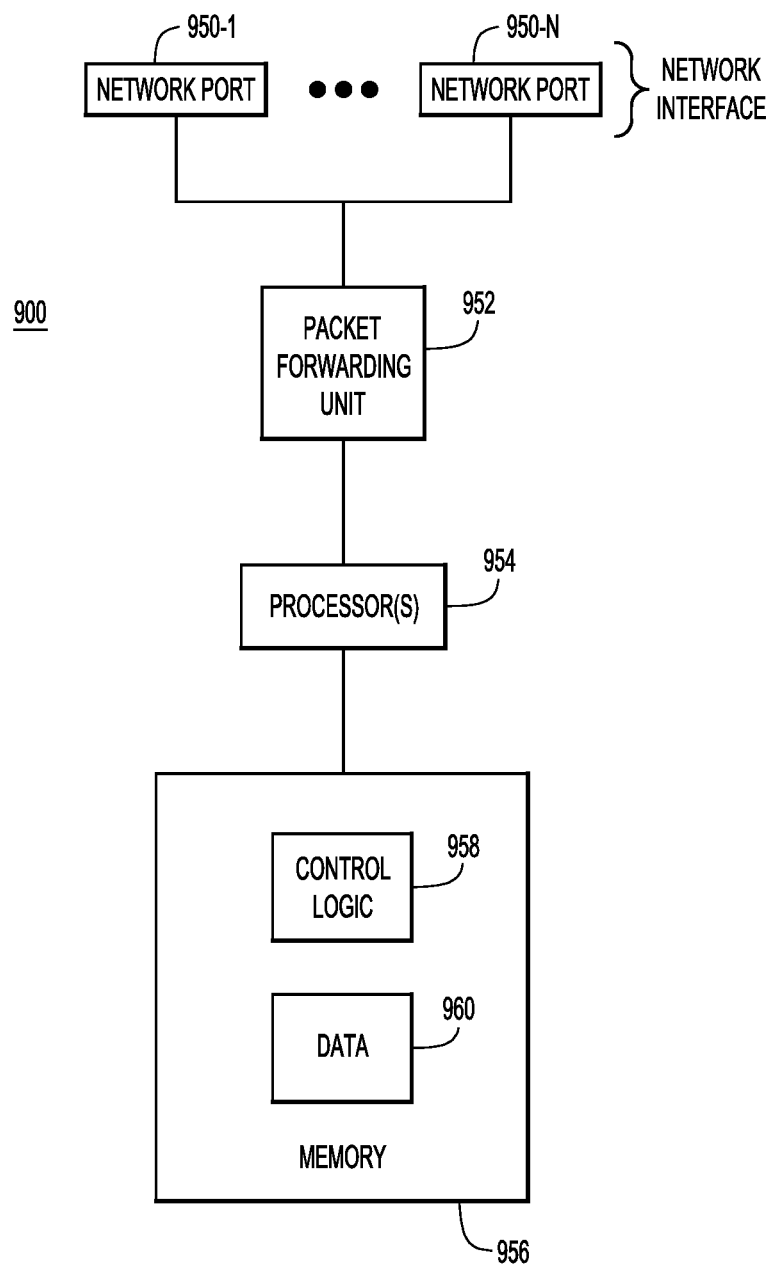
FIG. 9 is a block diagram of a packet processing device representative of the data inspection device, according to an example embodiment.

With reference to FIG. 9, there is a block diagram of a packet processing device 900 configured to perform the operations of DID 108, according to an embodiment. Packet processing device 900 may represent a network router, a network switch, a passive tap device, and the like. Device 900 may include a plurality of network ports 950-1 through 950-N, a packet forwarding unit or switch fabric 952 to perform routing/switching between the ports, a processor 954 (or multiple processors), and memory 956.

The memory 956 may comprise read only memory (ROM), random access memory (RAM), magnetic disk storage media devices, or other physical/tangible (non-transitory) memory storage devices. The processor 954 executes instructions stored in memory. Thus, in general, the memory 956 may comprise one or more tangible computer readable storage media (e.g., a memory device) encoded with software comprising computer executable instructions and when the software is executed (by the processor 954) it is operable to perform the DID operations described herein. Memory 956 may store control logic 958 to implement the methods performed by DID 108. The memory may also store data 960 used and generated by control logic 958.

In summary, embodiments presented herein implement fragmented hashing of data files, versus hashing of the entire contents of the data file, for both constructing hash trees configured on cloud repository and a data file of interest accessible to a data inspection device. The embodiments decrease an amount of resources on devices connected to a network to reliably determine a known file and its disposition if the file has been seen before, i.e., is known, relative to conventional cloud lookups. The embodiments also increases a rate at which a data file of interest is determined to have an unknown disposition, especially in the case of large data files, and reduces the impact of data file obfuscation techniques such as padding.

The presented embodiments use (i) systematic fragmented hashing of data files based on a file type, (ii) multiple offset schemas, with one chosen at random to create a unique fingerprint for data files, and (iii) leveraging of a hash trees, such as a Merkle tree, to uniquely identify a data file without hashing the entire file. The embodiments advantageously significantly reduce the latency added due to hash computation of file fingerprints. For example, computing a hash of the entire contents of a 5 GB file takes approximately 40 seconds, while fragmenting the hash may result in an unknown disposition in less than one second. Also, advantageously, padding at certain locations in a data file of interest may not result in a completely unknown disposition lookup, but may result in a partial match, which could indicate a data file that has only changed slightly in the middle or end of the file.

In summary, in one form, a method is provided comprising: at a server device configured to communicate over a network with a data inspection device having access to at least portions of a data file of interest, and assist the data inspection device with matching the data file to known data files represented on the server device: constructing for each known data file a respective hash tree, the constructing including: fragmenting the known data file into contiguous fragments; selecting from the contiguous fragments spaced fragments separated one from the next by a number of skipped fragments defined by an offset schema; and generating nodes of the hash tree based on hashes of the spaced fragments, but not the skipped fragments; receiving from the data inspection device a hash of a fragment of the data file of interest; comparing the received hash to the hash trees constructed using the offset schema; and sending compare results to the data inspection device indicating a match or a mismatch between the received hash and the hash trees.

In another form, an apparatus is provided comprising: a network interface unit to communicate over a network with a data inspection device having access to at least portions of a data file of interest; and a processor coupled to the network interface unit and configured to assist the data inspection device with matching the data file to known data files represented on the server device, wherein the processor is configured to: construct for each known data file a respective hash tree, wherein the processor is configured to: fragment the known data file into contiguous fragments; select from the contiguous fragments spaced fragments separated one from the next by a number of skipped fragments defined by an offset schema; and generate nodes of the hash tree based on hashes of the spaced fragments, but not the skipped fragments; receive from the data inspection device a hash of a fragment of the data file of interest; compare the received hash to the hash trees constructed using the offset schema; and send compare results to the data inspection device indicating a match or a mismatch between the received hash and the hash trees.

In yet another form, a method is provided comprising: at a data inspection device configured to match a data file of interest including contiguous fragments of data with known data files represented as respective hash trees on a server device configured to communicate with the data inspection device over a network: sequentially processing successive spaced fragments that are selected from the contiguous fragments so as to be spaced one from the next by a number of skipped fragments defined by an offset schema, the sequentially processing including, for each spaced fragment: generating a hash based on the spaced fragment, but not any skipped fragments; sending the hash and the offset schema to the server; receiving from the server device compare results that indicate a match or a mismatch between the hash and all hash trees on the server device that are based on the offset schema:

In a further form, non-transitory computer readable storage media is provided. The computer readable media is encoded with instructions, that when executed by a processor, cause the processor to perform each of the methods described above.

In still a further form, an apparatus (data inspection device) is provided including a network interface to enable network communications, and a processor. The processor is configured to: match a data file of interest including contiguous fragments of data with known data files represented as respective hash trees on a server device configured to communicate with the data inspection device over a network. The match operation is performed by sequentially processing successive spaced fragments that are selected from the contiguous fragments so as to be spaced one from the next by a number of skipped fragments defined by an offset schema. The the sequentially processing includes, for each spaced fragment: generating a hash based on the spaced fragment, but not any skipped fragments; sending the hash and the offset schema to the server; and receiving from the server device compare results that indicate a match or a mismatch between the hash and all hash trees on the server device that are based on the offset schema.

Although the techniques are illustrated and described herein as embodied in one or more specific examples, it is nevertheless not intended to be limited to the details shown, since various modifications and structural changes may be made within the scope and range of equivalents of the claim.

What is claimed is:

1. A method comprising:
   at a server device configured to communicate over a network with a data inspection device having access to at least portions of a data file of interest, and assist the data inspection device with matching the data file to known data files represented on the server device:
   constructing for each known data file a respective hash tree as a multi-level hash tree including leaf nodes that occupy a lowest level and non-leaf nodes that occupy ascending levels leading to a root node, which occupies a highest level, the constructing including:
   fragmenting the known data file into contiguous spaced fragments;
   selecting from the contiguous spaced fragments spaced fragments separated one from the next by a number of skipped fragments defined by an offset schema; and
   generating nodes of the hash tree based on hashes of the contiguous spaced fragments, but not the skipped fragments;
   receiving from the data inspection device a hash of a fragment of the data file of interest and an indication of a level of a hash tree to which the hash corresponds;
   comparing the hash to nodes at the level in each of the hash trees constructed using the offset schema; and
   sending compare results to the data inspection device indicating a match or a mismatch between the hash and the hash trees.

2. The method of claim 1, wherein the generating includes generating the leaf nodes each as a hash of a respective one of the contiguous spaced fragments, and the non-leaf nodes as combined hashes of their respective children, including the leaf nodes, leading to the root node.

3. The method of claim 1, wherein:
   the constructing includes constructing multiple respective hash trees to represent each known data file based on respective ones of multiple offset schemas;
   the receiving includes receiving an indication of one of the multiple offset schemas; and
   the comparing includes comparing the hash from the data inspection device only to the hash trees generated based on the indicated one of the multiple offset schemas.

4. The method of claim 1, wherein:
   the comparing includes comparing the hash from the data inspection device to the nodes only at the level in each of the hash trees.

5. The method of claim 1, wherein the known data files include known malware data files or known trusted data files.

6. The method of claim 1, wherein the generating includes generating each hash tree based on a Merkle tree construction.

7. The method of claim 1, further comprising, at the data inspection device:
   generating the hash from the fragment of the data file of interest based on the offset schema.

8. An apparatus comprising:
   a network interface unit to communicate over a network with a data inspection device having access to at least portions of a data file of interest; and
   a processor of a server device coupled to the network interface unit and configured to assist the data inspection device with matching the data file to known data files represented on the server device, wherein the processor is configured to:

construct for each known data file a respective hash tree as a multi-level hash tree including leaf nodes that occupy a lowest level and non-leaf nodes that occupy ascending levels leading to a root node, which occupies a highest level, wherein the processor is configured to:
fragment the known data file into contiguous spaced fragments;
select from the contiguous spaced fragments separated one from the next by a number of skipped fragments defined by an offset schema; and
generate nodes of the hash tree based on hashes of the contiguous spaced fragments, but not the skipped fragments;
receive from the data inspection device a hash of a fragment of the data file of interest and an indication of a level of a hash tree to which the hash corresponds;
compare the hash to nodes at the level in each of the hash trees constructed using the offset schema; and
send compare results to the data inspection device indicating a match or a mismatch between the hash and the hash trees.

9. The apparatus of claim 8, wherein the processor is configured to generate by generating the leaf nodes each as a hash of a respective one of the contiguous spaced fragments, and the non-leaf nodes as combined hashes of their respective children, including the leaf nodes, leading to the root node.

10. The apparatus of claim 8, wherein the processor is configured to:
construct multiple respective hash trees to represent each known data file based on respective ones of multiple offset schemas;
receive an indication of one of the multiple offset schemas; and
compare the hash from the data inspection device only to the hash trees generated based on the indicated one of the multiple offset schemas.

11. The apparatus of claim 8, wherein the processor is configured to:
compare the hash from the data inspection device to the nodes only at the level in each of the hash trees.

12. The apparatus of claim 8, wherein the known data files include known malware data files or known trusted data files.

13. The apparatus of claim 8, wherein the processor is configured to generate by generating each hash tree based on a Merkle tree construction.

14. A method comprising:
at a data inspection device configured to match a data file of interest including contiguous fragments of data with known data files represented as respective hash trees on a server device configured to communicate with the data inspection device over a network:
sequentially processing successive spaced fragments that are selected from the contiguous fragments so as to be spaced one from the next by a number of skipped fragments defined by an offset schema, the sequentially processing including, for each spaced fragment:
generating a hash based on the spaced fragment, but not any skipped fragments, such that iterations of the generating the hash in constructing at least a portion of a hash tree of the data file of interest as a multi-level hash tree including leaf nodes that occupy a lowest level and non-leaf nodes that occupy ascending levels leading to a root node, which occupies a highest level;
sending the hash, an indication of a level of the hash tree to which the hash corresponds, and the offset schema to the server device; and
receiving from the server device compare results that indicate a match or a mismatch between the hash and nodes at the level in each of all hash trees on the server device that are based on the offset schema.

15. The method of claim 14, wherein the sequentially processing further includes, for each spaced fragment:
if a mismatch is indicated, declaring that the data file does not match any of the known data files represented on the server device, and ceasing the sequentially processing.

16. The method of claim 15, wherein the sequentially processing further includes, for each spaced fragment:
if a match is indicated and not all of the spaced fragments in the data file have been processed, repeating the sequentially processing with a next spaced fragment; and
if a match is indicated and all of the spaced fragments in the data file have been processed, declaring that the data file matches one of the known data files represented on the server device.

17. The method of claim 15, further comprising, at the data inspection device:
sequentially receiving the contiguous fragments of the data file of interest over the network and performing the sequentially processing while the contiguous fragments are being received.

18. The method of claim 14, wherein:
the generating includes generating a combined hash based on a hash of the spaced fragment and a hash of a previously processed spaced fragment; and
the sending the hash includes sending the combined hash.

19. The method of claim 14, wherein each known data file on the server device is represented by multiple hash trees constructed based on and identified by respective ones of multiple offset schemas known to the data inspection device, the method further comprising, at the data inspection device:
selecting the offset schema from among the multiple offset schemas, wherein:
the generating includes generating the hash based on the selected offset schema; and
the sending includes sending the indication as an indication of the selected offset schema.

20. The method of claim 19, wherein the selecting includes randomly selecting the offset schema from the multiple offset schemas.

* * * * *